United States Patent [19]

Lapidus et al.

[11] Patent Number: 4,960,077
[45] Date of Patent: Oct. 2, 1990

[54] ANIMAL COLLAR

[75] Inventors: Herbert Lapidus, Ridgefield, Conn.; George F. Carrier, Wayland, Mass.

[73] Assignee: Combe Incorporated, White Plains, N.Y.

[21] Appl. No.: 406,694

[22] Filed: Sep. 13, 1989

[51] Int. Cl.[5] .......................................... A01K 27/00
[52] U.S. Cl. ................................................... 119/106
[58] Field of Search .................... 119/96, 106, 109; 24/30.5 P, 17 AP, 17 A, 17 B, 599

[56] References Cited

U.S. PATENT DOCUMENTS

| | | | |
|---|---|---|---|
| 2,612,139 | 9/1952 | Collins | 119/106 |
| 3,131,674 | 5/1964 | Dalton | 119/106 |
| 3,540,089 | 11/1970 | Franklin | 119/106 |
| 3,994,265 | 11/1976 | Banks | 119/106 |
| 4,020,795 | 5/1977 | Marks | 119/106 |
| 4,044,725 | 8/1977 | Miller | 119/106 |
| 4,180,016 | 12/1979 | George | 119/106 |
| 4,218,991 | 8/1980 | Cole | 119/106 |
| 4,224,901 | 9/1980 | Carey, Jr. | 119/106 |
| 4,250,838 | 2/1981 | Ott | 119/106 |
| 4,376,366 | 3/1983 | Miller | 119/106 |
| 4,541,364 | 9/1985 | Contello | 119/109 |
| 4,803,956 | 2/1989 | Corrigan et al. | 119/106 |

Primary Examiner—Gene Mancene
Assistant Examiner—R. Thomas Price
Attorney, Agent, or Firm—Roland T. Bryan

[57] ABSTRACT

An animal collar for controlling fleas and ticks which is formed as an elongated strip with fasteners at the ends thereof. The strip is a plastic material with an effective amount of pesticide dispersed therethrough and has a substantial cross section with a breaking strength such that the strip cannot be broken should the animal hang by the collar. The strip has at least one break point of greatly reduced cross section to provide for a fracture of the plastic strip. The fracture strength at the break point is determined by a dropped weight of about 60 percent of the weight that would cause fracture in straight gently applied tension. The collar is described as having two break points, each positioned opposite each other when the collar is fastened around the neck of the animal.

4 Claims, 1 Drawing Sheet

ANIMAL COLLAR

BACKGROUND OF THE INVENTION

This invention relates to the improvement of animal collars that are used for controlling fleas and ticks.

For some years pet animals have worn extruded plastic collars containing a pesticide. Such collars are exemplified by U.S. Pat. No. 4,250,838, which shows polyvinyl chloride and a pesticide, chlorpyrifos, extruded together and made into a pet collar which, when worn by the animal, controls fleas and ticks. Collars carrying pesticide of this general type have been widely used.

Pet owners, though thankful for the insect control aspect of these collars, worry that the collar could be caught on a tree or other protrusion and hang up the animal causing injury or death. This fear is particularly bad for cats that are want to climb trees.

Recent approaches to alleviate that concern have resulted in pet collars that become elongated sufficiently to allow the cat to slip its head out of the collar in the event of a hang up. One such collar uses a pesticide loaded plastic, with a portion of it containing a reduced cross-section in a multiloop serpentine arrangement and where the adjacent loops of the serpentine section are joined by thin plastic connectors. These connections are suppose to fail, allowing the serpentine section to straighten out and thus elongate the collar. Such an elongateable collar is unsatisfactory as the connections are so weak that the collar is easily extendable. The connections being less than 10 percent of the original collar are so weak that they tend to fail during ordinary usage. For instance, such connections fail when a 2.5 pound weight is used in a drop test as described hereinafter.

A second type of elongated collar that is known has a full sectioned pesticide filled plastic collar having an elastic band, one end of which holds the buckle. When an animal wearing such a collar is hung up, it can easily slip its head out of the collar. However, the strength of the elastic band is so low that almost any force will elongate it allowing the collar to be removed. Thus a scratching animal would easily remove it. Such a collar would not, therefore, provide the continuous pesticide control that is desired.

Accordingly, none of the known extendable pest control collars are satisfactory to solve the problem of continuous pest control.

SUMMARY OF THE INVENTION

The invention provides an animal collar for controlling fleas and ticks that is formed as an elongated strip, with fastening means at its ends, which has an effective amount of pesticide dispersed in a plastic material to provide a substantial cross-section of said strip with a breaking strength that cannot be broken should the animal hang by the collar. The invention improvement provides the elongated strip with at least one break point of greatly reduced cross-section wherein the breaking strength at the point is determined by a drop weight of about 60 percent of that of the weight of the animal for which the collar is designed. In addiiton, the invention provides that there be a plurality of break points substantially uniformly spaced along the length of the stirp between the fastening points.

It is further contemplated that the reduced cross-section is provided by a transverse horizontal cut through the substantial cross-section to leave the greatly reduced cross-section that will cause fracture upon animal hang up. As a further improvement to the animal collar, the greatly reduced cross-section formed by the horizontal cut can be further weakened by vertical cuts that cojoin the horizontal cut at each end thereof, whereby a weakened point for breaking stress is provided were the stress applied by a twisting motion of the animal.

The specific objects and advantages of the invention will be apparent from the description of the embodiments that are described hereinafter.

BRIEF DESCRIPTION OF THE DRAWINGS

The animal collar 10 is an elongated pesticide filled plastic strip with fastening means at the ends consisting of a buckle 13 at one end and buckle holes 13a on the other end. The collar is shown with two break points 14, 14a, at uniformly spaced positions on the collar between the fastening points of the fastening means 12. The break points 14, 14a provide a greatly reduced cross-section of the strip that is to fail in the event of the imposition of a predetermined load should the animal become hung by the collar from some protrusion which is not shown. The break points 14, 14a are made by a transverse cut through the broad width of the collar to leave the greatly reduced cross-section. In FIG. 2, one can see break point 14 that is shown cross-hatched and this reduced cross-section yields a breaking strength that is about 25 percent of that of the uncut collar.

Figure 2:
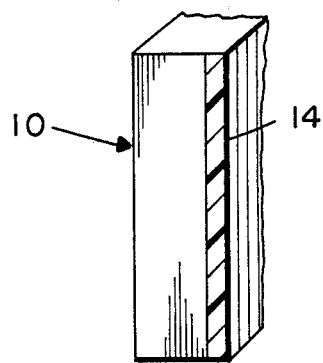
FIG. 2 is a cross-section taken along the line 2—2 of FIG. 1.
Figure 3:
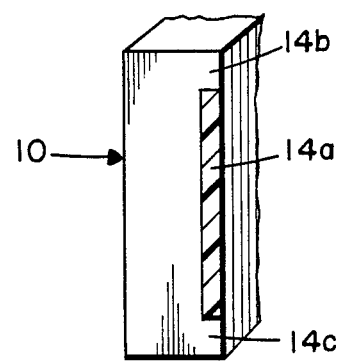
FIG. 3 is an alternate embodiment of the cross-section of the collar taken along line 3—3 of FIG. 1.

A preferred alternative reduced cross-section is shown in FIG. 3 where the break point 14a is illustrated. In this embodiment, the cross-section has been reduced even further by additionally making two vertical cuts, one at each end of the horizontal cut, to cojoin therewith. Thus, as shown in FIG. 3, as compared to FIG. 2, the strip has tear point cut portions 14b and 14c to leave the remaining cross-section 14a somewhat smaller and where the reduced cross-section can be more easily torn because of the vertical cuts that form sections 14b and 14c. This provision of tear points is to make it more easy for the animal to break the collar by twisting or turning as it struggles after it has been hung up. These struggles provide a dynamic stress loading condition on the collar which produces not only a twisting load application to the break points, but dynamically applied tensile stress along the length of the collar. The vertical cut sections 14b and 14c of FIG. 3, provide stress concentration points that lead to a failure at a lesser dynamic loading.

To provide the pest control desired, the collar strip has to be relatively large in cross-section, and experience has shown that the large cross-section provides a collar that is so strong that in the event of an animal hang up it would not break—thus possibly causing the death of the animal. The present invention therefore, provides a structure that gives a greatly reduced cross-section that is subject to failure at several dynamic loading levels while at the same time providing the collar with the look, feel, and pest control activity of a conventional collar.

The advantage of the invention is best understood by the following explanation.

With the collar 12 fastened around the neck of an animal in the form of a circle or hoop, in the event of a hang up, the force that would be induced in the collar on each side adjacent to the hang up point would be one-half of the force caused by the weight of the animal, whether it be static or dynamic. Accordingly, the invention contemplates that there would be at least two break points 14, 14a in the collar to be certain that at least one of them is subjected to full stress to insure that failure would occur in the event of hang up. The failure criteria for the break points of greatly reduced cross-section, has been determined to be about 60 percent of the weight of the animal for which the collar is designed, where the weight force is applied to a collar in a dynamic condition that simulates the struggling animal when hung up.

Figure 1:
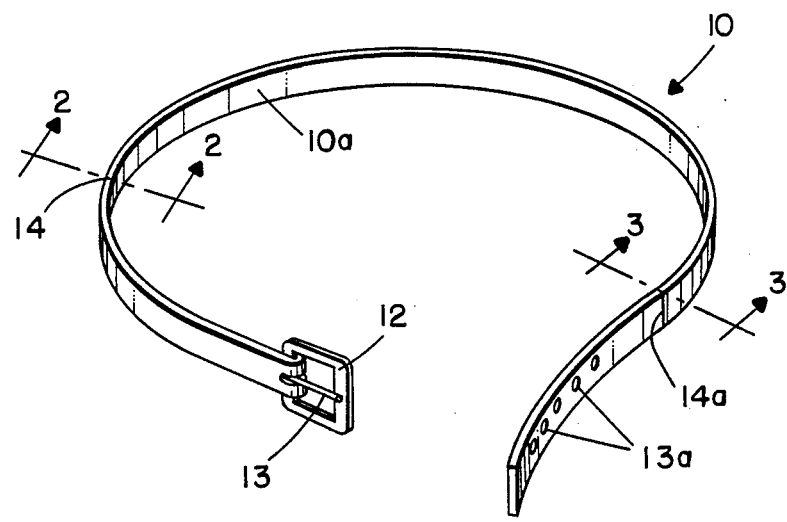
FIG. 1 is a perspective of a collar made according to the invention.

In order to arrive at the criteria for the safe breaking strength at the break point, experiments were conducted. In the specific embodiment of FIG. 1, the strip that was tested had cross-sectional dimensions of $\frac{3}{8}$ inch wide by $\frac{1}{8}$ inch thick, and was extruded with 3.6 percent by weight of chlorpyrifos with a polyvinyl formulation having a general formula as follows:

|  | Range - parts by weight |
|---|---|
| Polyvinyl Chloride homopolymer (resin) | 80.0 to 120.0 |
| Heavy metal soap (stabilizer) | 0.4–1.0 |
| Alkyl aryl phosphite (stabilizer) | 0.5–2.0 |
| Dialkyl phthalate (plasticizer) | 40.0–50.0 |
| Epoxidized oil (plasticizer-stabilizer) | 5.0–15.0 |
| Inert mineral filler | 5.0–15.0 |
| Pigments (colorants) | 0.1–2.0 |

The test for determining collar breaking points was predicated on the assumption that an animal, such as a cat, might get the collar caught on a protrusion from a tree or the like and suddenly find itself hung up by the collar with its paws off any support. The struggling that would ensue would give a greatly oscillating dynamic application of force to the collar that is related to the weight of the cat.

Accordingly, collars with greatly reduced cross-sections, as described with respect to FIGS. 2 and 3, were tested using a weight that is allowed to drop one inch before applying tension load to the collar cross-section. In this test, one end of the collar is fixed and the other end attached to the dropped weight. For the purpose of understanding the criteria of the invention, the breaking strength of the collar is determined by the test, which is called herein the "dropped weight" test.

It was found that for an animal having a weight of 10 pounds, the failure of the collar, using the dropped weight test, was as follows:

EXAMPLE 1

In the break point design of FIG. 2 made by a horizontal cut leaving 1/32 of an inch of remaining thickness (25.9% of original), the dropped weight which caused fracture was 8 pounds, and the same break point design failed with the application of 12 pounds in straight gently applied tension.

EXAMPLE 2

For the break point design of FIG. 3 where, after the horizontal cut, 1/32 of an inch was remaining and had vertical cuts of 1/32 inch cojoining the ends of the horizontal cut (29.9% of original), there was fracture at 5 pounds of dropped weight and at 10 pounds in a gently applied tension test.

All tests with thicknesses greater than 1/32 inch (25% or more of original), required too much weight to cause fracture and thus would be dangerous to the animal.

Accordingly, the invention criteria for determining the break point is that the greatly reduced cross-section of the collar should fracture when 60 percent of the weight of the animal is applied in a drop test. This same percentage has been found to apply where the weight in the drop test was about 60 percent of the gently applied weight that caused failure in tension. For Example 1, the drop weight was 50 percent of the weight applied in tension, and for Example 2, the drop weight was 66 percent of the weight that would cause failure in tension.

Although the present invention has been described with reference to preferred embodiments, those skilled in the art will recognize that changes may be made in form and detail without departing from the spirit and scope of the invention.

What is claimed is:

1. An animal collar for controlling fleas and ticks which is formed as an elongated strip with fastening means at the ends thereof, said strip being a plastic material with an effective amount of pesticide dispersed therethrough and having a substantial cross section with a breaking strength such that the strip cannot be broken should the animal hang by the collar, the improvement comprising: said strip having at least one break point of greatly reduced cross section to provide for a fracture of the plastic strip wherein the fracture strength at said break point is determined by a dropped weight of about 60 percent of the weight that would cause fracture in straight gently applied tension.

2. An animal collar according to claim 1 in which there are two break points, each positioned opposite each other when the collar is fastened around the neck of the animal.

3. An animal collar for controlling fleas and ticks which is formed as an elongated strip with fastening means at the ends thereof, said strip being a plastic material with an effective amount of pesticide dispersed therethrough and having a substantial cross section with a breaking strength such that the strip cannot be broken should the animal hang by the collar, the improvement comprising: said strip having at least one break point of greatly reduced cross section to provide for a facture of the plastic strip wherein the fracture strength at said break point is determined by a dropped weight of about 60 percent of the weight that would cause fracture in straight gently applied tension, said break point formed by a transverse cut through a broad width of said strip.

4. An animal collar according to claim 3 in which there are vertical cuts cojoining said transverse cut in each end thereof to provide fracture points for stress applied by a twisting motion of a hung animal.

* * * * *